US006201769B1

(12) United States Patent
Lewis (10) Patent No.: US 6,201,769 B1
(45) Date of Patent: Mar. 13, 2001

(54) METRONOME WITH CLOCK DISPLAY

(76) Inventor: Andrew C. Lewis, 1730 Great Hwy., San Francisco, CA (US) 94122-3923

( * ) Notice: Subject to any disclaimer, the term of this patent is extended or adjusted under 35 U.S.C. 154(b) by 0 days.

(21) Appl. No.: 09/546,896

(22) Filed: Apr. 10, 2000

(51) Int. Cl.[7] ............................. G09B 47/00; G09B 15/00

(52) U.S. Cl. ............................. 368/10; 84/464 R; 84/484

(58) Field of Search ............................. 568/10, 82, 239; 84/464 R, 464 A, 470, 484

(56) References Cited

U.S. PATENT DOCUMENTS 4,193,257 * 3/1980 Watkins ................................. 84/486
5,515,764 * 5/1996 Resen ..................................... 84/484

* cited by examiner

Primary Examiner—Vit Miska
(74) Attorney, Agent, or Firm—Howard Cohen (57) ABSTRACT

A metronome that marks musical time by displaying a clock face having a measure of music depicted about the periphery includes a rotating indicator that sweeps about the clock face to indicate the rhythm. In one aspect, a computer program generates a screen display having a clock face and a clock hand mounted in the center to rotate continuously in typical clock fashion. Using drag-and-drop techniques, notes and other rhythm symbols are placed on the clock face. As the clock hand rotates past each of the indicia, an audible sound is generated to denote that particular aspect of the rhythm in real time. In addition, a display of one or more regular polygons may be presented to indicate counting in a number equal to the number of sides of the polygon. Polygons may be overlaid to display and sound polymetric rhythms, each vertex corresponding to a counted beat. The metronome may comprise a mechanical or electromechanical device having a variable speed clock drive, and the clock hand may sound the rhythm directly by percussive contact or proximity interaction with each note indicator on the clock face. The display of the clock face may be augmented by providing lighted indicators placed at each of the indicia and illuminated as the clock hand passes by. Alternatively, a plurality of lighted points are spaced about the periphery of the clock face and illuminated in clockwise sequence to indicated the progress of counting a measure of music.

24 Claims, 9 Drawing Sheets

METRONOME WITH CLOCK DISPLAY

BACKGROUND OF THE INVENTION

The present invention relates to a metronome having expanded potential both for indicating musical time and as a teaching aids for musical education, and, more particularly, to a device for teaching musical rhythm and rhythm notation.

Generally speaking, most music students are exposed to melody and rhythm before they begin to study music. Children acquire songs through listening to recordings, radio, television, and children's songs sung by parents and family members. Rhythms may be learned from similar sources, and also from playground games and chants. Thus an innate sense of music may develop before any formal instruction begins.

For beginning students, the placement of notes on a staff bears a spatial relationship to the tune that the notes represent, and there is usually an intuitive understanding of this association. However, the teaching of rhythm involves time signatures and note values that have no spatial relationship, and are thus not as intuitive as melody. For some students, rhythm notation may be an obstacle to early understanding of music, particularly for younger students. Although pedagogical techniques have been developed to deal with this problem, there is a lack of a simple spatial or graphic visual aid for teaching rhythm notation, and for relating that notation to the dynamic presentation of musical rhythm.

For more advanced music students, and for music professionals, the metronome remains a fundamental tool for practice. Aside from the familiar pendulum metronome, there are now electrical and electronic metronomes for keeping time in music. These device are generally characterized as marking time by emitting clicks or beeps or flashes of light at regular, selectable intervals. However, these devices are typically devoid of any display of musical rhythm, and have no means for indicating the proper manner of marking the rhythm of a measure of music.

SUMMARY OF THE INVENTION

In a general aspect, the present invention provides a metronome that marks musical time by displaying a clock face having a measure of music depicted about the periphery thereof, and a rotating indicator that sweeps about the clock face to indicate the rhythm of the depicted measure. The indicator may comprise a clock hand extending generally radially on the clock face, or may comprise an array of LEDs or similar lights disposed about the periphery of the clock face and illuminated in sequence to mark the rhythm. The metronome may provide audible indications of each note of the measure, or visual indications of each note, or both.

The present invention generally comprises a device for providing a dynamic visual aspect to a metronome and a visual aid in the teaching of musical rhythm notation. In one aspect, the device comprises a metronome that provides a display similar to a clock face, thus capitalizing on a student's familiarity with a common timekeeping device. The clock face displays beat counts and note values about the periphery thereof, and provides a clock hand that rotates in clockwise fashion to pass by the beat counts and note values and generate appropriate sounds for the beat count and notes. The invention thus provides a dynamic visual and physical indication that correlates musical notation with the rhythm it represents, and provides an aid in teaching and understanding written music. That is, it shows how written rhythms are interpreted in real time, through a physical and aural demonstration of musical notation. It uniquely creates a visual representation of meter in time, and connects aural, visual, and written musical language.

In one aspect, the metronome comprises a computer program that generates a screen display having a clock face and a clock hand mounted in the center of the face to rotate continuously in typical clock fashion. The clock face is provided with indicia distributed about the periphery thereof that represent the important aspects of a musical time signature. As the clock hand rotates past each of the indicia, an audible tone, click, a synthesized voice, or other sound is generated to denote that particular aspect of the rhythm in real time. In this way the assembly can actualize the sound of one bar of written rhythm and have a concurrent visual representation of the same bar of written music moving at exactly the same rate as the audible tones that are generated.

For example, the clock face may present 4/4 time with the digits one through four spaced about the circumference and separated by 90°, the numeral one placed at the top of the clock face (at the 12 o'clock position) the numeral two placed at the three o'clock position, the numeral three placed at the six o'clock position, and the numeral four placed at the nine o'clock position. As the clock hand rotates through one rotation, it generates a characteristic sound as the hand points to each number, so that it actualizes the sound of one measure of written music with each rotation.

In addition, the clock face may be provided with indicia representing the rhythm characteristics that occur between the counted beats. For example, between each numeral the indicia "e", "+", and "a" may be provided in equally spaced fashion to represent the rhythm counts that may be present between the beats. Thus, for sixteenth notes in 4/4 time, the rhythm would be sounded as "ONE ee and ah TWO ee and ah THREE ee and ah FOUR ee and ah". To aid this representation, the sixteenth notes may be placed (by typical drag-and-drop techniques) on the clock face adjacent to each of the appropriate indicia. Likewise, eighth notes may be placed adjacent to each numeral and each "+" indicator, so that the metronome will count in eight as "ONE and TWO and THREE and FOUR and". Quarter notes may be placed adjacent to each numeral, so that metronome will count in four as "ONE . . . TWO . . . THREE . . . FOUR . . . ". Half notes may be placed adjacent to the one and three numerals to count half notes: "ONE . . . THREE . . . ".

As another example, the clock face may represent 3/4 time with the digits one through three spaced about the circumference and separated by 120°. As described above, the intervening indicia may be provided to aid in counting sixteenth, eighth, quarter, and half notes. In general, any time signature may be represented, with the numerator of the signature determining the numerals presented on the clock face and the numerals being separated by equal angles about the clock face. A plurality of interchangeable clock faces may be displayed, and selected as required for the lesson being taught or the meter being studied.

Each distinct indicia may be expressed audibly by prior selection of a distinct and unique sound or voiced word, or any combination of audible sounds that are appropriate and expressive of the concept being taught. In addition, the rate at which the clock hand rotates may be selectively varied to change the tempo of the rhythm representation, as is known in prior art metronomes.

In a further aspect, the invention depicts meter using a display of one or more regular polygons. For example, a triangle may be presented to indicate counting in three, etc.

In addition, the clock face may display regular polygons such as a triangle to represent 3/4 time, overlaid and centered with a rectangle representing 4/4 time, with one vertex of each polygon at a common point. As the clock hand rotates, a selected sound is generated whenever the hand intersects a vertex of either of the polygons. Thus polymetric rhythms such as four over three, five over four (represented by a pentagon overlaid with a triangle), or five over eight (represented by a pentagon overlaid with an octagon) may be sounded and displayed providing an important aid in teaching difficult polyrhythms. In addition, the points at which the moving clock hand intersects the sides of the polygons may comprise a moving illuminated spot to illustrate the differing velocities and phrasing that is created by polyrhythms.

For classroom use, the computer display may be projected on a large screen for easy viewing by a large number of students.

In another aspect, the metronome may comprise a mechanical or electromechanical device having a clock drive that is controlled by an operator-controlled selector, such as a potentiometer, or frictional drag control, or a voltage controlled oscillator, or electronic clock signal divider circuit, as are known in the prior art. The audible sounding of the indicia provided on each clock face may be carried out by the clock hand directly by percussive contact, by completing momentary electrical contacts associated with each indicator on the face, or interrupting coupled LED/photosensor devices (known in the prior art) at each indicator, or the like.

In a further aspect, the metronome may include a single clock face having a plurality of socket receptacles formed in the face and spaced about the periphery thereof. A plurality of note tokens are provided, each token having the appearance appropriate for its rhythm value (eighth note, quarter note, etc.). A student or instructor may place selected note tokens in the receptacles of the clock face to represent at least one measure of written music. Thereafter, when the metronome is started, the clock hand will cause the generation of audible indications of the note tokens as the hand passes and points to or strikes each token.

In any of the embodiments described herein, the display of the clock face may be augmented by providing lighted indicators, such as LEDs placed at each of the indicia and illuminated as the clock hand passes by. Thus the rotation motion may be accomplished without a hand, by utilizing a sequence of lights arranged in a circular pattern blinking in concurrence with the rhythm being audibly sounded.

DESCRIPTION OF THE PREFERRED EMBODIMENTS

The present invention generally comprises a device for providing a dynamic visual aid for the study of rhythm and the teaching of musical rhythm notation. With regard to FIG. 1, one embodiment of the invention comprises a computer program that generates a screen display 11 having the appearance of a clock face 12 and the functions of a graphical user interface, as is commonly known in the computer arts. The clock face 12 is generally circular, although any recognizable clock face shape may be displayed. A single clock hand 13 is also displayed, anchored at the center of the clock face and extending radially therefrom. The clock hand 13 is driven to rotate about the central anchor point 14, as indicated by arrow 16, at an angular velocity that is selectively variable. The concept of a clock face and a clock hand rotating clockwise is familiar at an early age to virtually all persons worldwide.

The clock face display 12 is further provided with a plurality of integers (in FIG. 1, integers 1, 2, 3 and 4) that are spaced at equal angles about the periphery, with the "1" disposed at the "12 o'clock" position on the clock face. Thus the numeral two is placed at the three o'clock position, the numeral three is placed at the six o'clock position, and the numeral four is placed at the nine o'clock position. Each numeral of the display 12 represents a counted beat.

Figure 1:
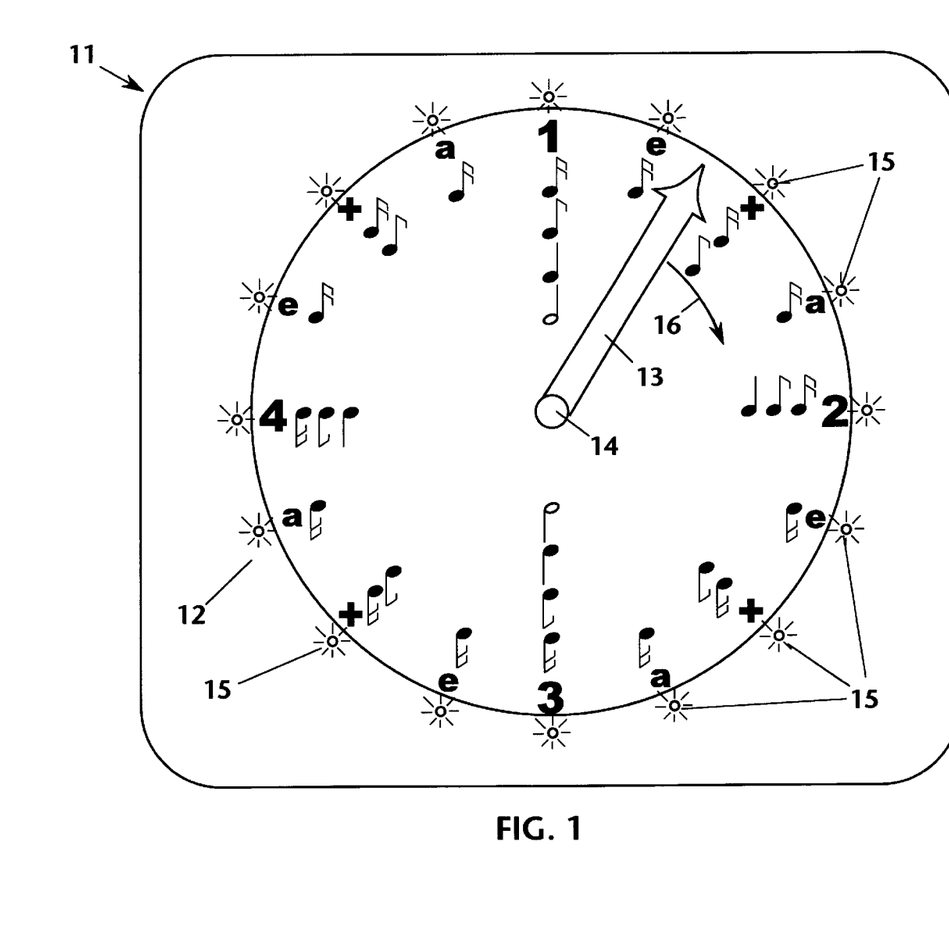
FIG. 1 is a plan view of the computer screen display of the invention, depicting a metronome clock face that illustrates 4/4 rhythms and related multiples thereof.

In addition, the clock face may be provided with indicia representing the rhythm characteristics that occur between the counted beats. For example, between each numeral the indicia "e", "+", and "a" may be provided in equally spaced fashion to represent the rhythm counts that may be present between the beats. Thus, for sixteenth notes in 4/4 time, the rhythm would be sounded as "ONE ee and ah TWO ee and ah THREE ee and ah FOUR ee and ah". To aid this representation, the sixteenth notes may be placed (by typical drag-and-drop techniques) on the clock face adjacent to each of the appropriate indicia. Likewise, eighth notes may be placed adjacent to each numeral and each "+" indicator, so that the metronome will count in eight as "ONE and TWO and THREE and FOUR and". Quarter notes may be placed adjacent to each numeral, so that metronome will count in four as "ONE . . . TWO . . . THREE . . . FOUR . . . ". Half notes may be placed adjacent to the one and three numerals to count half notes: "ONE . . . THREE . . . ". Thus a complete measure of music in four time may be represented by the notes placed about the periphery of the clock face 12.

Thereafter, when the user actuates the metronome clock to begin operation, the hand 13 starts at the 12 o'clock position and rotates clockwise. As the hand 12 encounters each of the integers and each of the notes placed about the periphery, the program generates a sound (previously selectable by the user) to audibly signify the rhythm values that are depicted visually on the screen display. The rhythms may be spoken by synthesized or sampled voice(s), as indicated above, or may be sounded by synthesized or sampled sounds. The hand 13 will continue to rotate and the rhythms will continue to be indicated audibly until operation is stopped by the user. Thus the rhythm representing one measure will be reiterated indefinitely, reiteration being the most common and most effective pedagogical and professional tool. Thereafter, the note representations on the screen display may be moved or replaced by drag-and-drop techniques to depict another measure of music, and the process repeated. The angular velocity of the hand may be selectively varied to change the tempo of the rhythm representation. (Note that all the possible notes are depicted in FIG. 1, up to all sixteenth notes, and that an actual measure of music will be depicted by a selection of notes that is less than that shown.)

Figure 2:
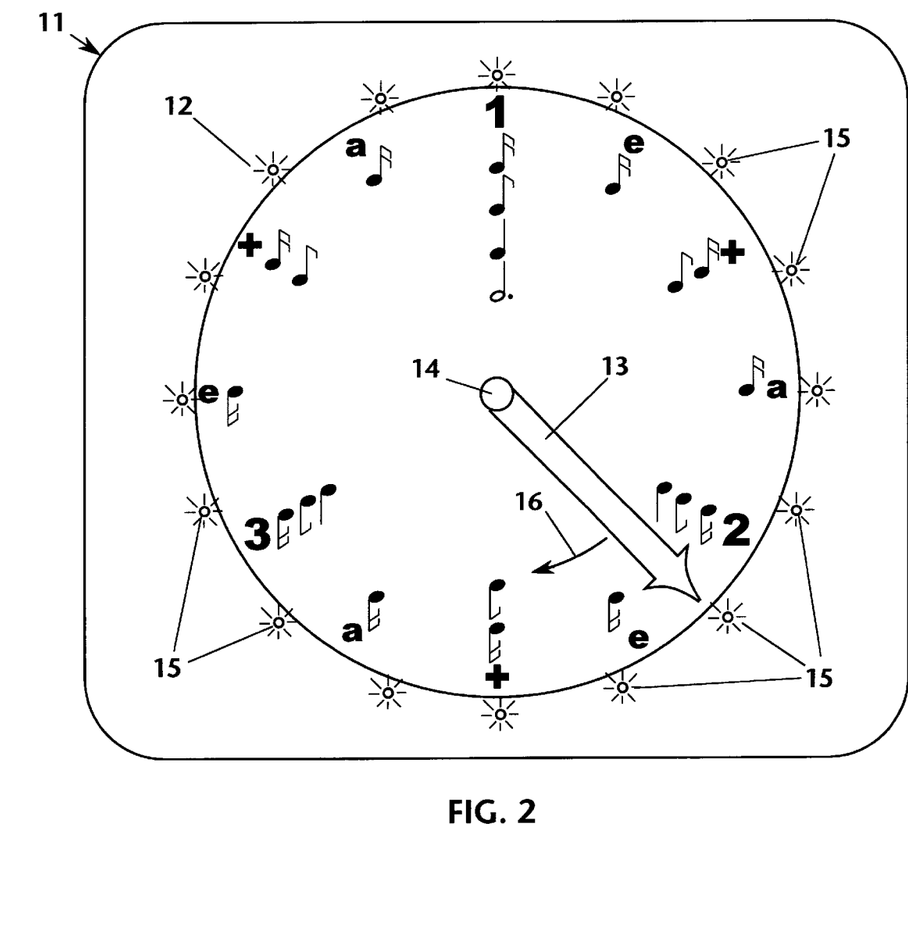
FIG. 2 is a plan view of the computer screen display of the invention, depicting a metronome clock face that illustrates 3/4 rhythms and related multiples thereof.

As another example, the clock face may represent 3/4 time with the digits one through three spaced about the circumference and separated by 120°, as shown in FIG. 2. As described above, the intervening indicia may be provided to aid in counting sixteenth, eighth, quarter, and half notes. In general, any time signature may be represented, with the numerator of the signature determining the highest numeral presented on the clock face and the numerals being separated by equal angles about the clock face.

The clock face display may further include a plurality of illuminated points 15 disposed about the periphery, each associated with the angular position of one of the indicia described previously. The points 15 may be illuminated in clockwise sequence as the hand 13 arrives at the respective point, thereby providing a precise visual indication of the instant of the beat. Alternatively, the hand 13 may be omitted, and the lighted points may be actuated in clockwise sequence to indicate the progress of the rhythmic representation. The lighted points 15 may be used with or without the adjunct of an audible indication, so that a silent practice may be carried out by a musician.

The computer screen display 11 may be augmented with further visual aids by the addition of one or more regular polygons. A single regular polygon may depict one meter with graphic impact. With regard to FIG. 3, the screen display of FIG. 2 may further include an equilateral triangle 17 centered on the anchor point 14 and having one vertex thereof extending to the integer 1 of the display, so that the other two vertices extend to the integers 2 and 3 of the display. This geometric form visually reinforces the concept of counting by three. In addition a square 18 may be presented on the display, the square 18 being centered on the anchor point 14 and having one vertex extending to the integer 1. The program is set to emit an audible indication whenever the hand 13 sweeps past any vertex of either of the polygons shown on the display. Thus the triangle provides a count in three time, while the square provides a count in four time, and the result is a polyrhythm 12/8 time. This visual geometric display, combined with the audible indication of the polyrhythm, provides a valuable teaching aid for a subject that is notoriously difficult for some music students to learn and for professionals to execute.

Figure 6:
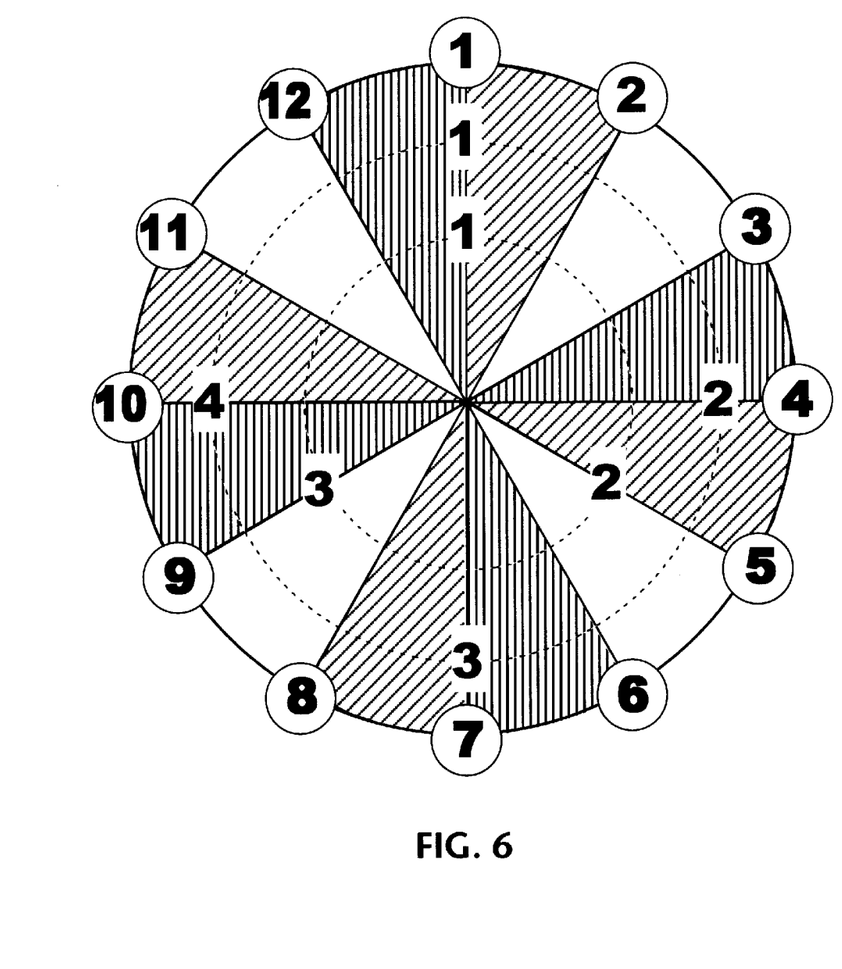
FIG. 6 is a plan view of a further embodiment of the metronome clock face that illustrates the playing of three and four time in a context of twelve time.
Figure 7:
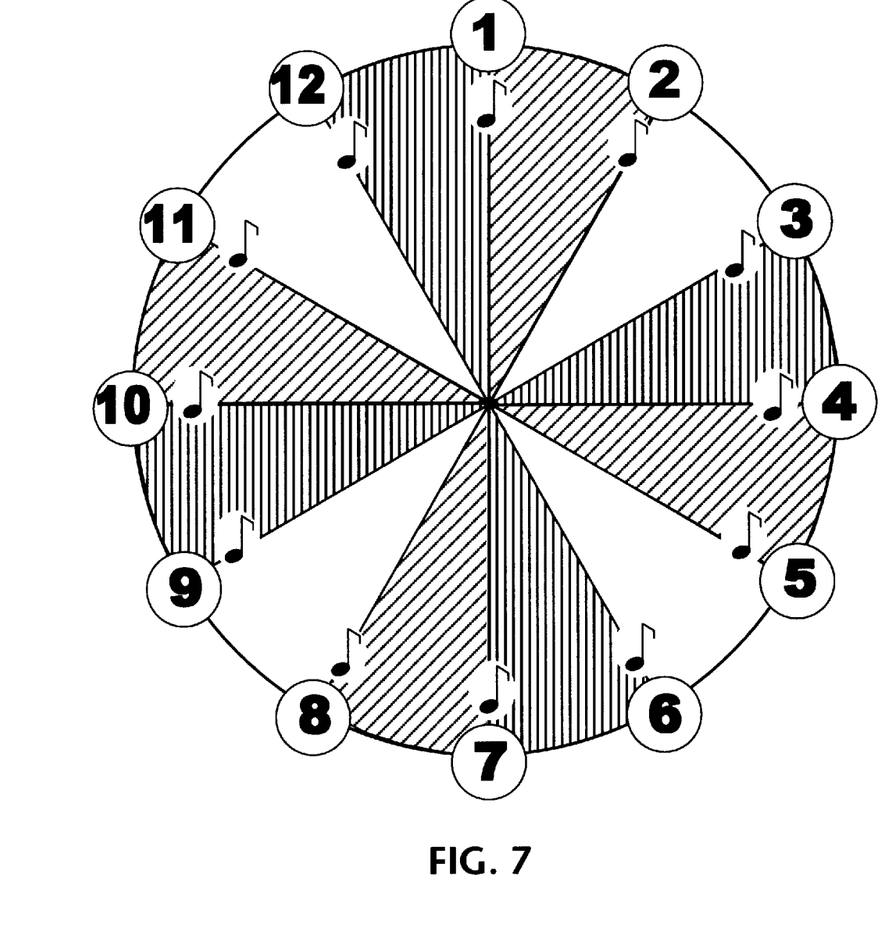
FIG. 7 is a plan view of a further embodiment of the metronome clock face that illustrates the playing of a 12/8 rhythm.

A further display for portraying 12/8 time is shown in FIG. 7. The display provides the integers 1–12 arrayed at equal angles about a circle, the included angle between serially adjacent integers comprising a beat region. Beat regions receiving the same audible indication are hatched in common, and the audible indication may extend the duration of the hand (not shown) in each beat region, or may sound only as the hand enters each beat region. FIG. 6 depicts a similar graphical user interface, with an inner circle having the integers 1–4 arrayed thereabout adjacent to the 1, 4, 7, and 10 positions, respectively, of the outer circle to indicate the counting of time in four within the twelve beats of 12/8 time. Likewise, an innermost circle includes the integers 1–3 arrayed at equal angles adjacent to the 1, 5, and 9 positions of the outer circle to indicate the counting of time in three within the twelve beats of the measure.

Figure 8:
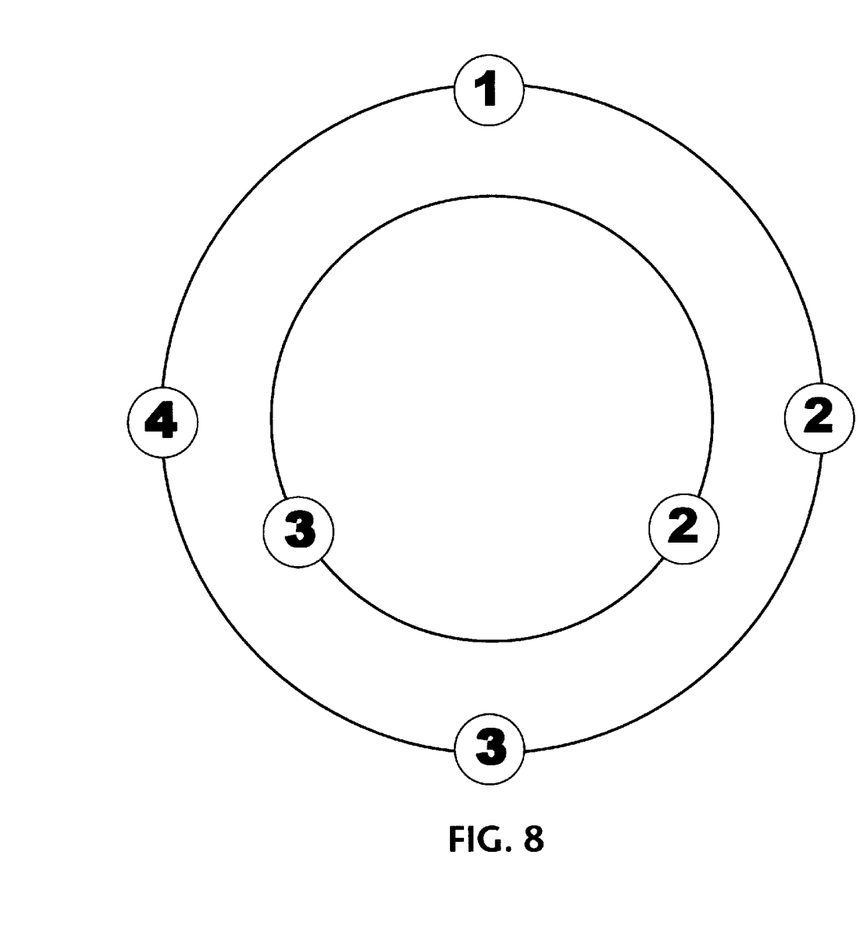
FIG. 8 is a plan view of another embodiment of the metronome clock face that illustrates a simplified format for playing a four over three polyrhythm.
Figure 9:
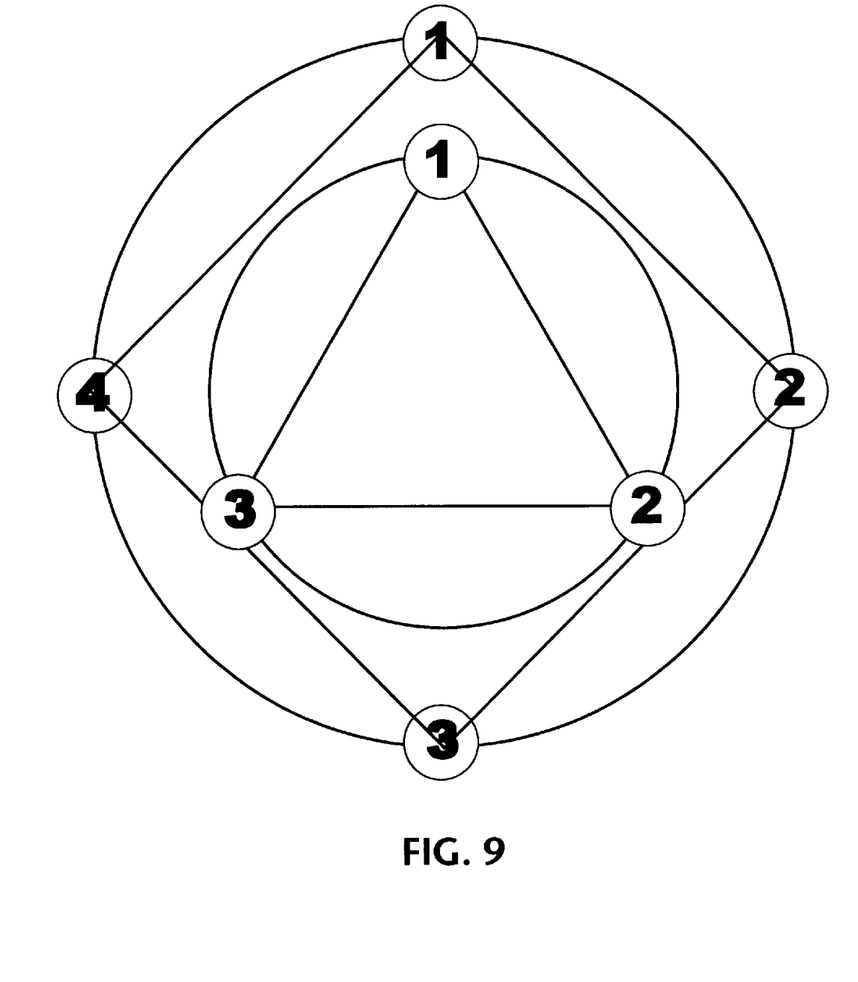
FIG. 9 is a plan view of the clock face as shown in FIG. 8, with the addition of polygons to enhance the depiction of the polyrhythm.

In FIG. 8, a further GUI display is shown in which the integers 1–4 are arrayed about an outer circle and the integers 1–3 are arrayed about a concentric inner circle, consistent with the layout shown in FIG. 6 but with the beat regions eliminated for a simpler display. Again, any form of hand may rotate about the display of FIG. 8 to indicate the beat when pointing to the inner and outer digits. Likewise, shown in FIG. 9, the polygons such as the triangle and square described previous, may be added to the display of FIG. 8, with the triangle vertices located on the inner circle and the vertices of the square on the outer circle. In any of these embodiments, the indication of the beat in the time shown by the rotating hand may comprise audible or visual indicators which may differ or be the same for each beat in the separate three and four counts.

Figure 3:
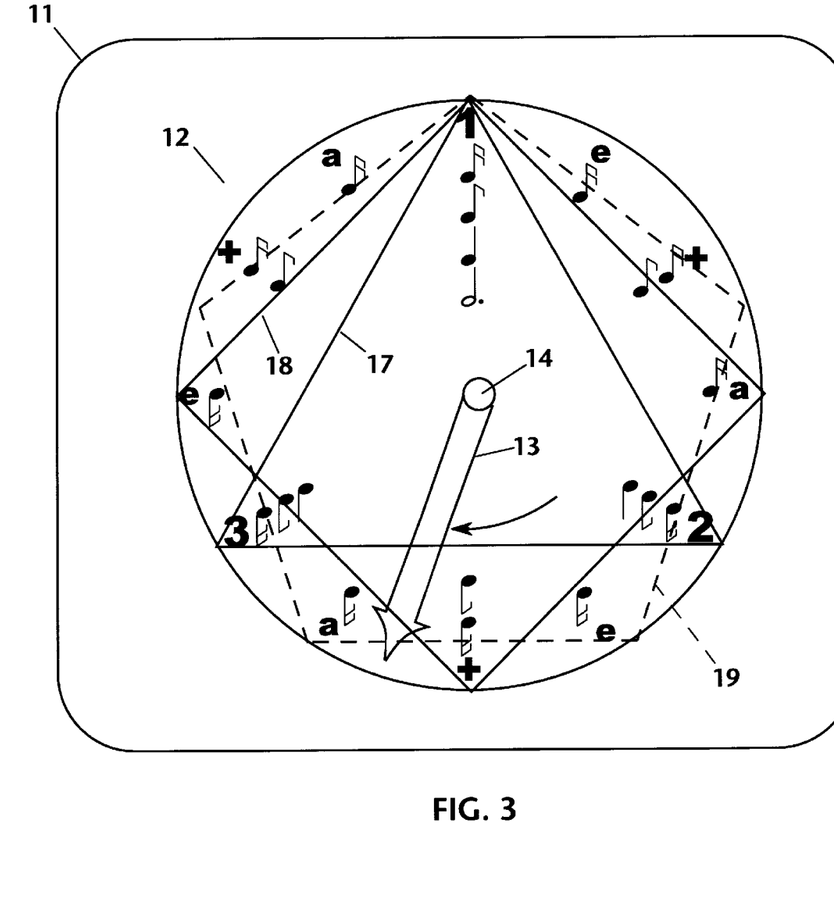
FIG. 3 is a plan view of the computer screen display of the invention, depicting a metronome clock face that illustrates 3/4 rhythm and also indicates polyrhythms using overlaid polygons on the clock face.

Likewise, a pentagon 19, shown in broken line in FIG. 3, may be employed to provide a visual and audible indication of counting in five, so that a polyrhythm of five over four may be portrayed by the invention. The pentagon 19 may be added to the display of FIG. 1 to portray five over four time. It follows that a pentagon and hexagon may be combined in a screen display 11 to portray 5/8 time, and the like.

Figure 4:
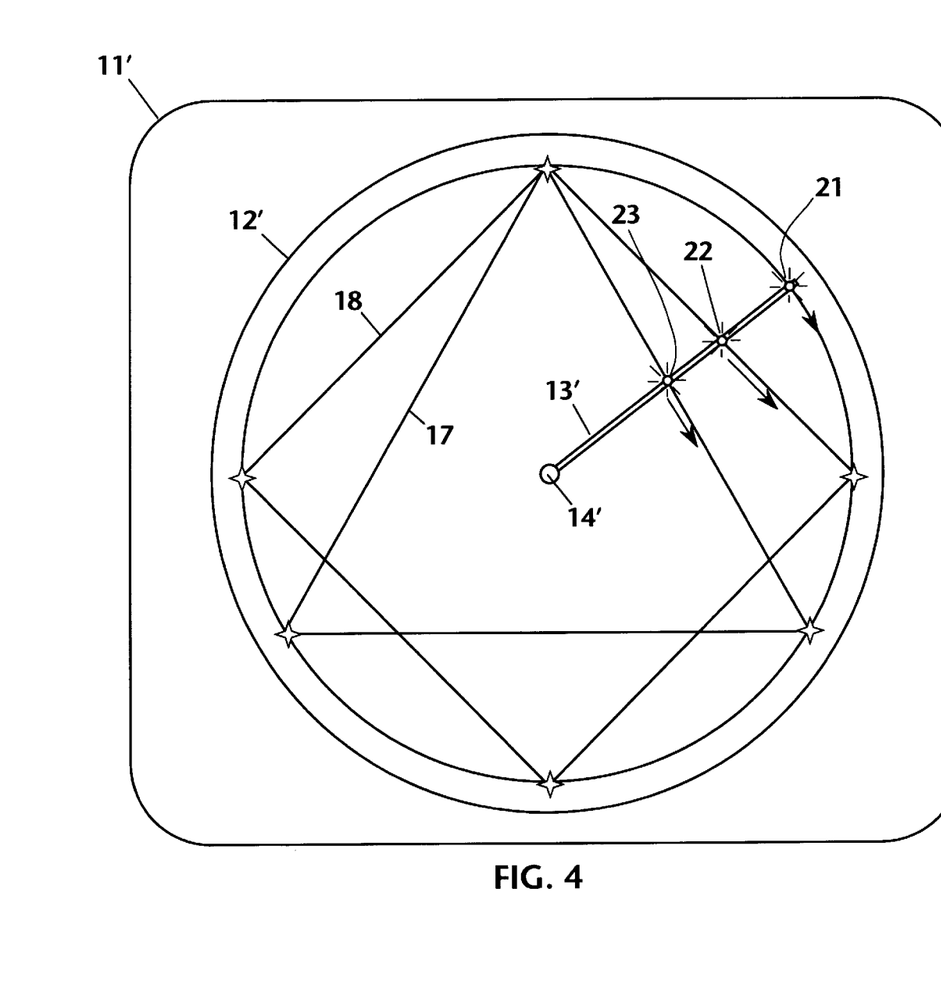
FIG. 4 is a plan view of a further embodiment of the computer screen display of the invention, depicting a metronome clock face that illustrates polyrhythms using overlaid polygons.

With regard to FIG. 4, the computer screen display 11' may exhibit the triangle 17 and square 18, as described previously, with or without the indicia described previously. As before, both polygons include a respective vertex extending to the 12 o'clock position of the clock face 12', and are centered on the anchor point 14'. The rotatable clock hand 13' is provided with an illuminated spot 21 at the intersection of the hand 13' and the periphery of the clock face. The spot 21 is constrained to move with the hand and thus under constant angular velocity. In addition, a moving illuminated spot 22 is generated at the intersection of the hand 13' and the square 18, and a moving illuminated spot 23 is generated at the intersection of the hand 13' and the triangle 17.

As described previously, the clock hand 13' is driven in the display to rotate clockwise about the anchor point 14'. As the hand 13' encounters a vertex of the triangle 17 or square 18, the computer program generates appropriate sounds to signify the polyrhythm four over three. Although the illuminated spot 21 travels at a constant angular velocity about the clock face 12', the illuminated spots 22 and 23 travel at linear velocities (along their respective polygons) that vary with the angular disposition of the hand 13'. The differential in the linear velocities is strikingly visually apparent, and is very useful in teaching the phrasing and anticipation of the beats in one rhythm or in a polyrhythm. Also, the traveling spots 22 and 23 each intersect and merge with the spot 21 at the respective vertices of the triangle 17 and square 18. This merged lighted indication reinforces the impression of the occurrence of the beat, thus promoting better understanding of the polyrhythm.

The software application of the invention is a 'virtual' metronome. The GUI design components are (1) a face upon which beat regions, note values and beat subdivisions are displayed, (2) a metronome 'arm', and (3) various control mechanisms such as toggle switches, slider bars and volume controls.

Figure 5:
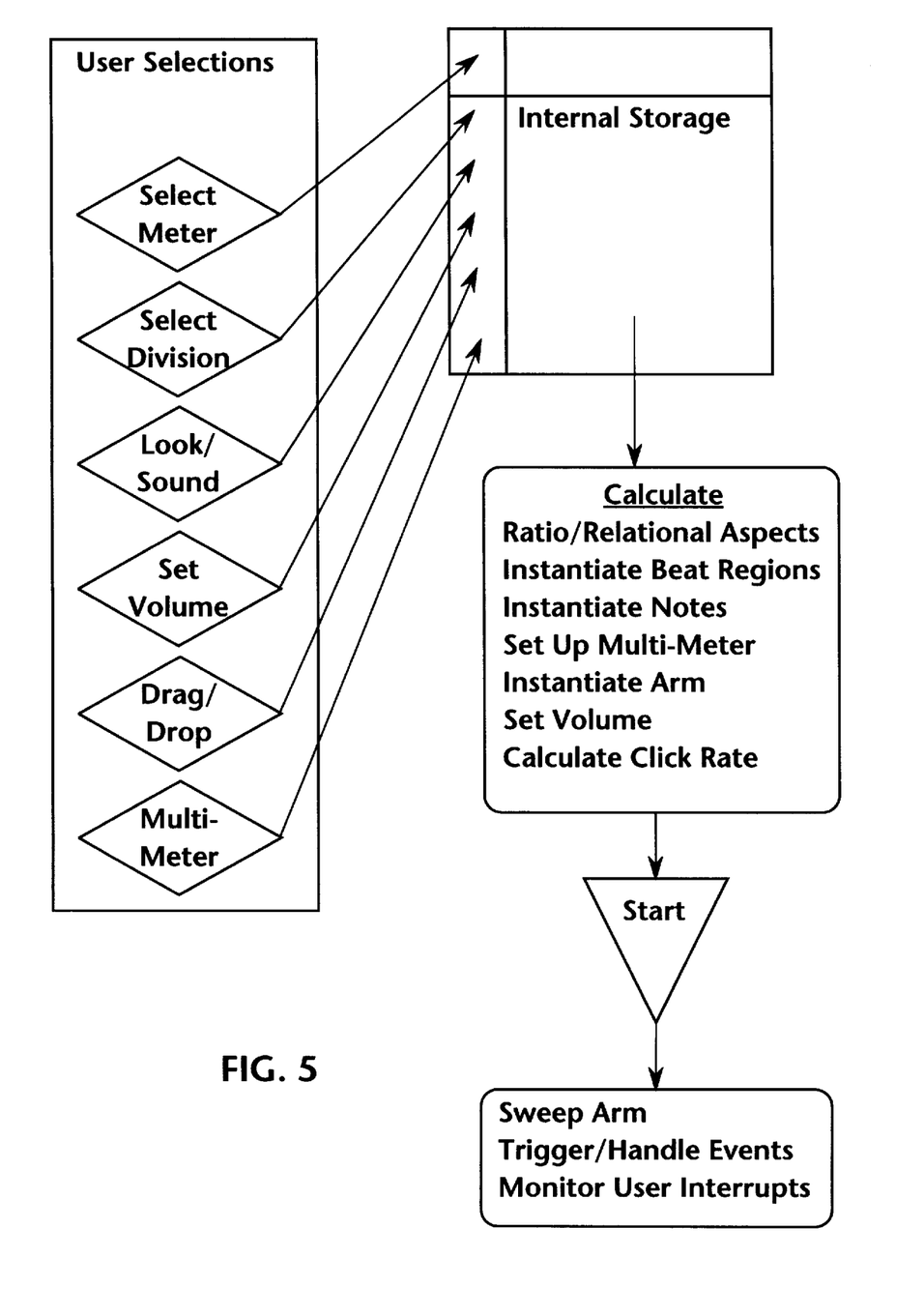
FIG. 5 is a functional block diagram of the software program that generates the computer screen metronome clock face display and enables user control of various parameters of the metronome.

A schematic representation of the software program of the invention is shown in FIG. 5. An object-oriented design methodology is followed, the primary objects being notes, beat regions, polygons, and the clock hand. These are described below. Off-the-shelf or custom-designed GUI controls (ActiveX or equivalent) are used for the user controls and are listed below. The program may be realized in html language to facilitate distribution over the Internet. System settings and user preferences are modifiable and stored in a separate configuration file as appropriate.

The program converts user settings to (1) a graphic realization, with evenly-spaced beats and sub-beats and (2) to an appropriately timed triggering of a variety of sounds generated by the computer's internal speaker or an externally ported device and (3) an appropriately timed triggering of various visual effects related to event triggers such as the clock hand entering or leaving a beat region and (4) a smoothly sweeping (and customizable) clock hand. Other aspects include a smoothly sweeping clock hand, customizable looks-and-feels, drag-and-drop rhythm creation, and others. The subdivisions of a musical bar are simple mathematical ratios, as are the ratio between these selections and speed of the computer's internal clock. The fundamental formulations for speed, click, clock hand sweep, etc. are calculated against precise knowledge of the computer clock speed, screen size, color and resolution options and other lower-level hardware settings.

The user setup functions enabled and stored by the program include the following:
1) Select Meter (3/4, 4/4, etc.)
2) Select rhythmic divisions to display
3) Select Look/Sound schemas or per note
4) Set Speed
5) Set Volume
6) Drag-Drop Rhythms and/or Notes, as desired
7) Make multi-meter selections, if appropriate
8) Press Start.

The program is designed to carry out the following functional operations:
1) Calculates ratio/relational aspects
2) Instantiates Beat Regions and places beat region dividers and x/y/z coordinates of notes relative to meter
3) Sets up multi-meter super-impositions as appropriate
4) Instantiates notes as required, referencing user settings for look, sound, and the like
5) Instantiates clock hand per style selections
6) Sets internal speaker volume
7) Calculates click rate
8) Initiates operation and monitors for user interrupts.
9) The program defines the clock hand as a pixel array of points on the GUI. The program constantly compares this array to arrays of system objects coordinates (as selected and positioned by the user). Using Touched-Over-Released methods (known in the prior art) or the like, the program responds to coincidence of the clock hand with the objects coordinates and generates an appropriate visual and/or audible output. The program also converts the tempo setting set by the user to a corresponding clock hand sweep speed.

The system settings include such data as registration information, user preferences, schemas, and range settings. A built-in help system for the user includes at least the following items:
1) Help text narrative and connectivity to a proprietary web site for support and downloads
2) Index of keywords
3) Natural language help query mechanism
4) Context sensitive search based on Help ID properties per declared object.

The program allows for various visual 'themes' which may be selected by the user according to their preferences. These may include, but are not limited to the following:

Radar Screen—A classic 'old-fashioned' radar screen analogue with a thin sweeping line radiating in a circular grid, with notes represented as blips.

Classical—A clean $19^{th}$ century look with scrolls and lyres and classical note representations Jazzy—A more informal handwritten look Contempo—A modern, dramatic look Clock—A standard 'old-fashioned' clock face with beats instead of minute subdivisions Metronome—The typical metronome design with an arm sweeping from left to right Beep—The more modern look of a dial with a beep and LCD Shadowed—A three-dimensional look with shadowed objects.

Different indicating sounds may be selected per beat component or beat region. Each point can be programmed to produce multiple sounds in order to accomplish the programming of overlying rhythmic patterns, as in prior art drum machines. Each note value (whole, half, quarter, etc.) can have a different sound associated with it so as to aurally distinguish it from notes of different values. These sounds may include, but are not limited to the following:

Beep—a simple beep, with differing frequencies

Click or Tick—a click sound, distinguished from others by frequency and duration Chirp—similar to Click Fun—A variety of silly sounds Gross—For the immature, various grotesque sounds Percussive—all drum and cymbal sounds Custom—Users may design and install their own sounds. Other sounds are contemplated and may be added at a later date.

The graphical user interface (GUI) controls used to specify settings for the operation of the clock metronome include the following:

Speed—drawbar (range 20 to 240)

Volume—slider (range 0 to 100)

On/Off—toggle button

Sound on/off—toggle button

Motion on/off—toggle button

Sound/Look—Various note value representations (i.e. whole note, half note), with combo box selections for Visual style and Sound selection Beat Meter selection—spin controls and/or combo/text boxes (range for numerator 1 to 100, selection for denominator 1, 2, 4, 8, 16, 32, 64)

Note Selection—Custom-designed note toolbar which allows for drag-and-drop functionality onto the clock face screen display. This will allow users to hear a representation of any rhythm they choose to design.

Beat Region specification—each Beat Region has a property box which will generally be accessed with a right-mouse click. In this, the user may specify settings for each region, including color, sound, action to take upon specific events and other settings.

Note Groupings—depending on the meter, users may select to group subdivisions and to have the program play the lead element of the group. This would be useful in understanding odd meter groupings (i.e. 7/8 may be grouped as 2+2+3 or 2+3+2 or 3+2+2). This grouping control would be a set of text boxes in which the user can specify groupings of the fundamental note value.

Multi-Rhythm and Multi-Meter Setup—In effect, a multi-rhythm or meter setup is simply two or more metronome clock configurations superimposed on each other or running concurrently. In this case, a clone of the first configuration may be made and the settings adjusted so as not to conflict or overly merge with the prior settings, then the selection is carefully superimposed over the first on the clock display. Logical limitations based on look and sound compatibility must be imposed when the user indicate that they wish to impose a second meter. In other words, if a largely dark color scheme is chosen for the first, they must be limited to a largely light color scheme for the second. An analogous situation exists with sounds. The controls contemplated for this setup are exactly similar to the initial setup, with only the options limited based on the argument just made. A Multi-Meter Setup Wizard with guided steps is provided for this function.

Polyrhythm Setup—regular polygon shape descriptions are stored in memory and selectable to create a display as in FIGS. 3 or 4, including related active beat regions and illuminated moving spots.

The note object properties include:
Name
Value
Look
Color
Sound
Volume
X Position
Y Position
Z Position
Height
Width
Icon
Border
Drag Icon
Enabled
Visible
Index
Link
Mouse Icon
Tab Index
Tool Tip
Help ID
Auto Size
Display Context
Help Context The methods for carrying out the note functions include:
On Touched By clock hand—Gets focus from hand
On Over
On Released—Loses focus from hand
Create
Destroy
On Mouse Over
On Mouse Down
On Click
On Drag
On Drop The clock hand properties include:
Name
Look
Position
Height
Width
Style
Speed
Color
Drag Icon
Enabled
Visible
Index
Link
Mouse Icon
Tab Index
Tool Tip
Help ID
Auto Size
Display Context
Help Context The methods for operating with the clock hand include:
On Touch
On Over
On Release
Create
Destroy The beat/sub-beat region properties include:
Name
Range of Circle (Arc)
Beat Value
Look
Color
Sound
Change Color/Sound on Touch
Volume
Border
Drag Icon and Mode
Enabled
Visible
Index
Link
Mouse Icon
Tab Index
Tool Tip
Help ID
Auto Size
Display Context
Help Context The methods for operating with the beat/sub-beat regions include:

On Touched By clock hand (Got Focus)
On Over
On Released (Lost Focus)
Create
Destroy
On Drop Note
On Move Note
On Mouse Over
On Mouse Down
On Click
On Drag
On Drop In a further embodiment, the invention may include a mechanical or electromechanical assembly that presents a clock face substantially as shown in FIGS. 1–4. A clock drive is connected to a clock hand that is disposed to sweep over the clock face, and the speed of the clock drive may be selectively controlled by a potentiometer, or frictional drag control, or a voltage controlled oscillator, or electronic clock signal divider circuit, as are known in the prior art. In analogy to the computer screen display, the audible sounding of the indicia provided on each clock face may be carried out by the clock hand directly, by completing momentary electrical contacts associated with each indicator on the face, or interrupting coupled LED/photosensor devices (known in the prior art) at each indicator, or by direct percussive contact, or the like. The illuminated points 15 are formed by LEDs or similar light sources.

The metronome may generate a single audible sound at the one position of the face, and the remainder of the measure would be represented only visually, without any further sounding.

Likewise, the clock face of the mechanical assembly may include a plurality of socket receptacles formed in the face and spaced about the periphery thereof. A plurality of note tokens are provided, each token having the appearance appropriate for its rhythm value (eighth note, quarter note, etc.). A student or instructor may place selected note tokens in the receptacles of the clock face to represent at least one measure of written music. Thereafter, when the metronome is started, the clock hand will cause the generation of audible indications of the note tokens as the hand passes and points to each token.

The invention thus provides a metronome in which the visual representation of rhythm may be more prominent that the audible presentation of rhythm.

The foregoing description of the preferred embodiment of the invention has been presented for purposes of illustration and description. It is not intended to be exhaustive or to limit the invention to the precise form disclosed, and many modifications and variations are possible in light of the above teaching without deviating from the spirit and the scope of the invention. The embodiments described are selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

What is claimed is:

1. A metronome for indicating musical rhythms, including:
   a clock face and a moving indicator sweeping clockwise about said clock face;
   at least one beat indicator disposed on said clock face;
   means for generating a beat indication whenever said moving indicator points to said at least one beat indicator.

2. The metronome of claim 1, wherein said moving indicator comprises a clock hand.

3. The metronome of claim 1, further including a graphical user interface on a computer display, said clock face, moving indicator, and said at least one beat indicator comprising graphic indicia displayed by said graphical user interface.

4. The metronome of claim 3, further including a plurality of said beat indicators selectively placed on said clock face and angularly spaced thereabout.

5. The metronome of claim 4, wherein said beat indicators include a plurality of notes.

6. The metronome of claim 4, wherein said beat indicators include a plurality of numerical indicia angularly spaced about said clock face in serial numerical order.

7. The metronome of claim 4, further including at least one polygon displayed on said clock face, each vertex of said at least one polygon comprising a beat indicator.

8. The metronome of claim 7, further including a plurality of said polygons displayed on said clock face, each polygon having a number of vertices equal to a respective time signature, said plurality of polygons depicting a polyrhythm.

9. The metronome of claim 8, wherein said plurality of polygons are substantially centered on said clock face.

10. The metronome of claim 7, wherein said moving indicator includes a linear indicator intersecting said at least one polygon, and further including an illuminated spot displayed at the intersection of said linear indicator and said at least one polygon, said illuminated spot translating along and about the perimeter of said at least one polygon.

11. The metronome of claim 10, further including a plurality of said polygons displayed on said clock face and centered thereon, each of said plurality of polygons having a respective illuminated spot displayed at the intersection of said linear indicator and the respective polygon.

12. The metronome of claim 11, wherein said linear indicator includes an outer end disposed adjacent to the periphery of said clock face display, and a further illuminated spot disposed at said periphery of said clock face display and translating therealong in concert with said outer end of said linear indicator.

13. The metronome of claim 12, wherein said plurality of polygons include vertices disposed at said periphery of said clock face display.

14. The metronome of claim 1, wherein said beat indication comprises an audible signal.

15. The metronome of claim 1, wherein said beat indication comprises a visible signal.

16. The metronome of claim 15, wherein said beat indication further includes an audible signal.

17. The metronome of claim 1, wherein said clock face includes a periphery, and said moving indicator comprises a plurality of illuminatable points spaced about said periphery and actuated serially and sequentially in clockwise fashion.

18. The metronome of claim 6, wherein said beat indicators further include a plurality of musical note indicia.

19. The metronome of claim 18, wherein said beat indicators are placed on said clock face by drag-and-drop fashion.

20. The metronome of claim 18, wherein said means for generating a beat indication includes sound generating means for emitting a unique sound for each different beat indicator.

21. The metronome of claim 1, wherein said moving indicator comprises a clock hand extending generally radially on said clock face, and further including means for rotating said clock hand at a constant angular velocity.

22. The metronome of claim 1, further including a plurality of beat indicators arrayed at equal angles about said clock face, and further including a plurality of beat regions, each subtending an angle from the center of said clock face between adjacent beat indicators.

23. The metronome of claim 22, wherein said beat indicators comprise a first plurality of integers in serially adjacent order.

24. The metronome of claim 23, wherein said beat indicators further include a second plurality of integers in serially adjacent order in a circle concentric within said first plurality of integers.

* * * * *